US010011166B2

United States Patent
Ogura et al.

(10) Patent No.: US 10,011,166 B2
(45) Date of Patent: Jul. 3, 2018

(54) SHUTTER GRILLE DEVICE (71) Applicant: Honda Motor Co., Ltd., Tokyo (JP)

(72) Inventors: Futoshi Ogura, Wako (JP); Shinichi Kitajima, Wako (JP); Takamune Tsukahara, Wako (JP); Kousuke Moro, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 11 days.

(21) Appl. No.: 15/408,960

(22) Filed: Jan. 18, 2017

(65) Prior Publication Data

US 2017/0210221 A1 Jul. 27, 2017

(30) Foreign Application Priority Data

Jan. 21, 2016 (JP) .................................. 2016-009462
Oct. 25, 2016 (JP) .................................. 2016-208461

(51) Int. Cl.
| | |
|---|---|
| B60R 22/00 | (2006.01) |
| E05F 15/00 | (2015.01) |
| G05D 1/00 | (2006.01) |
| G05D 3/00 | (2006.01) |
| G06F 7/00 | (2006.01) |
| G06F 17/00 | (2006.01) |
| B60K 11/08 | (2006.01) |
| F01P 7/10 | (2006.01) |

(52) U.S. Cl.
CPC ............ *B60K 11/085* (2013.01); *F01P 7/10* (2013.01); *F01P 2025/13* (2013.01); *F01P 2025/48* (2013.01); *F01P 2025/66* (2013.01)

(58) Field of Classification Search
CPC ....... B60K 11/085; F01P 7/10; F01P 2025/13; F01P 2025/48; F01P 2025/66
USPC .......................................................... 701/49
See application file for complete search history.

(56) References Cited

U.S. PATENT DOCUMENTS

| | | | |
|---|---|---|---|
| 2011/0281515 A1* | 11/2011 | Lockwood | B60K 11/085 454/75 |
| 2013/0046445 A1* | 2/2013 | Nishimura | B60H 1/3208 701/49 |

FOREIGN PATENT DOCUMENTS

| | | | | |
|---|---|---|---|---|
| JP | 2014-080072 A | * | 5/2014 | ............. B60K 11/04 |
| JP | 2014-80072 A | | 5/2014 | |

* cited by examiner

*Primary Examiner* — Aaron L Troost
*Assistant Examiner* — Paula L Schneider
(74) *Attorney, Agent, or Firm* — Westerman, Hattori, Daniels & Adrian, LLP (57) ABSTRACT To provide a shutter grille device that can reduce the number of opening and closing operations and extend product life. A shutter grille device includes: a shutter grille provided in an air intake for guiding air into a power station in which a power source of a vehicle is provided; and a controller that controls opening and closing of the shutter grille. The controller disables closing of the shutter grille during a first interval after opening of the shutter grille, and has a second interval before enabling opening of the shutter grille after closing; and the first interval is set longer than the second interval.

11 Claims, 7 Drawing Sheets

SHUTTER GRILLE DEVICE

CROSS REFERENCES TO RELATED APPLICATIONS

The present application claims priority under 35 U.S.C. 5119 to Japanese Patent Application No. 2016-009462, filed Jan. 21, 2016, entitled "Shutter Grille Device" and Japanese Patent Application No. 2016-208461, filed Oct. 25, 2016, entitled "Shutter Grille Device." The contents of these applications are incorporated herein by reference in their entirety.

TECHNICAL FIELD

The present disclosure relates to a shutter grille device of a vehicle.

BACKGROUND

A device that can control the flow rate of air flowing into an engine room, on the basis of opening and closing operations of a shutter mechanism provided in a grille opening part at the front of a vehicle body has been known. A device described in Japanese Patent Application Publication No. 2014-80072 calculates the next necessary idle time on the basis of the last operation time and idle time of a shutter mechanism. Here, in the device described in Japanese Patent Application Publication No. 2014-80072, basically, an operation time of the shutter mechanism is a time between turning on and off of an ignition switch, and an idle time is a time between turning off and on of the ignition switch (see paragraphs 0025 to 0027). When the ignition switch is turned on before the elapse of the calculated next necessary idle time, the device described in Japanese Patent Application Publication No. 2014-80072 does not activate the shutter mechanism until the elapse of the necessary idle time, to thereby suppress heating of a motor that is a drive source of the shutter mechanism.

SUMMARY

However, whether or not the device described in Japanese Patent Application Publication No. 2014-80072 can reduce the number of opening and closing operations of the shutter mechanism mainly depends on the time between turning off and on the ignition, and when there are sufficiently long time intervals between driving operations of the vehicle, the number of opening and closing operations of the shutter mechanism cannot be reduced. Additionally, since the vehicle sometimes runs without actuating the shutter mechanism at all, the vehicle may run without achieving necessary functions (aerodynamic performance, avoidance of high temperature of devices inside engine room, for example).

It is preferable to provide a shutter grille device that can reduce the number of opening and closing operations, and extend product life.

In one aspect, a shutter grille device of the present disclosure includes: a shutter grille provided in an air intake for guiding air into a power station in which a power source of a vehicle is provided; and a controller that controls opening and closing of the shutter grille, and is characterized in that: the controller disables closing of the shutter grille during a first interval after opening of the shutter grille, and has a second interval before enabling opening of the shutter grille after closing; and the first interval is set longer than the second interval.

The above aspect includes a case where only a first interval is set, and a second interval is not set (set to zero).

According to this configuration, since the first interval in which closing is disabled after opening is set longer than the second interval in which opening is disabled after closing, the number of opening and closing operations can be reduced to extend product life.

The controller may set the first interval such that the lower the speed, the longer the first interval.

According to this configuration, the devices inside the power station can be cooled favorably, even during low-speed travel.

The first interval may be preset on the basis of a target lifetime durable number of opening and closing operations, and a predicted lifetime number of operations of the shutter grille.

According to this configuration, the number of opening and closing operations can be reduced to extend product life, while effects of opening and closing the shutter grille can be exerted favorably.

The controller may set the first interval on the basis of a lifetime mileage of the vehicle, and a lifetime number of operations of the shutter grille.

According to this configuration, a longer first interval may be set when the lifetime number of operations of the shutter grille is large, for example, to reduce the number of opening and closing operations and extend product life.

After the elapse of the first interval after opening of the shutter grille, the controller may: extend disabling of closing of the shutter grille, when a parameter related to any of ambient temperature, load of a device in the power station, and an estimated heat amount of the device in the power station is not lower than a threshold; and when the parameter drops below the threshold, cancel disabling of closing of the shutter grille.

According to this configuration, after the elapse of the first interval, disabling of closing of the shutter grille is continued when a parameter related to any of ambient temperature, load of devices in the engine room, and the estimated heat amount of the devices in the engine room is not lower than a threshold. Hence, the number of opening and closing operations can be more effectively reduced to extend product life.

After the elapse of the first interval after opening of the shutter grille, the controller may extend disabling of closing of the shutter grille when it is assumed that opening will be required after closing.

According to this configuration, the number of opening and closing operations can be more effectively reduced to extend product life.

After the elapse of the first interval after opening of the shutter grille, the controller may extend disabling of closing of the shutter grille when it is assumed that opening will be required after closing, on the basis of a parameter related to any of ambient temperature, load of a device in the power station, and an estimated heat amount of the device in the power station.

According to this configuration, the number of opening and closing operations can be more effectively reduced to extend product life.

In another aspect of the present disclosure, a shutter grille device comprises: a shutter grille provided in an air intake guiding air into a motor room in which a power source of a vehicle is provided; and a controller that controls opening and closing of the shutter grille. The controller enables closing of the shutter grille at the time when the vehicle has run a predetermined amount of distance after opening of the shutter grille.

According to this feature, the controller enables closing of the shutter grille at the time when the vehicle has run a predetermined amount of distance after opening of the shutter grille. Thus, it is possible to obtain an operation similar to an operation in which the first interval is set such that the lower a speed of the vehicle, the longer said first interval becomes.

The controller may further enable closing of said shutter grille at the time when an interval time has elapsed after opening of said shutter grille. According to this feature, it is possible to adequately enable closing of said shutter grille even with extremely low vehicle speed or zero vehicle speed.

According to embodiments of the present disclosure, for example, the number of opening and closing operations of a shutter grille device can be reduced to extend product life.

DETAILED DESCRIPTION

Next, an embodiment of the present disclosure will be described in detail with reference to the drawings. Note that in FIG. 1, arrows indicating "front and rear" show the longitudinal direction of the vehicle, and "right and left" show the horizontal direction (vehicle width direction) as viewed from a driver's seat, respectively.

First Embodiment

Figure 1:
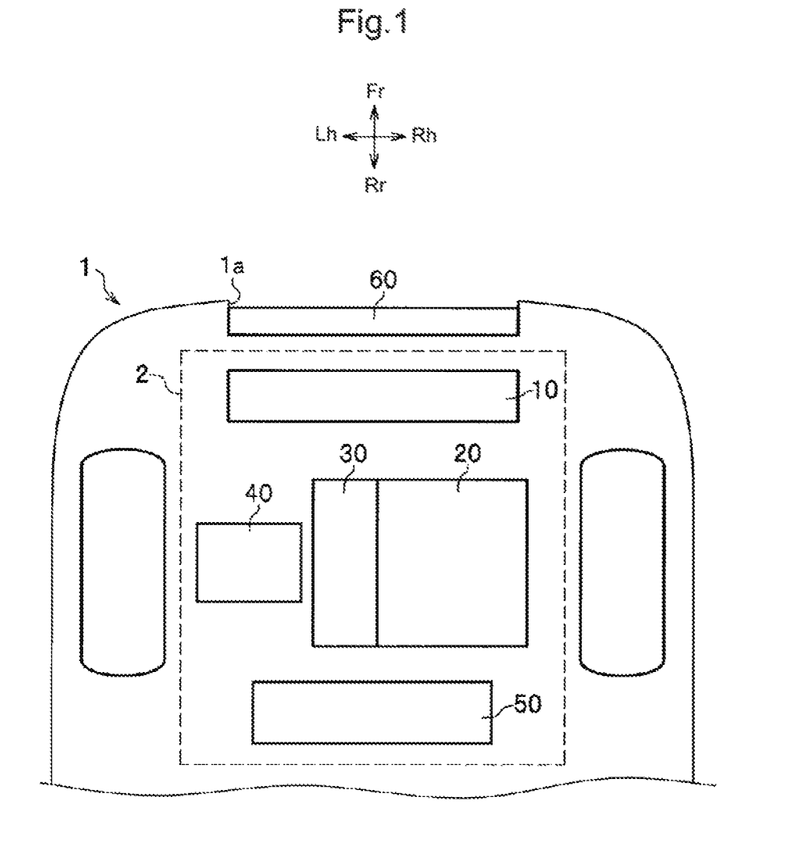
FIG. 1 is a schematic drawing of a vehicle to which a shutter grille device of an embodiment of the present disclosure is applied.

As shown in FIG. 1, a front part of a vehicle 1 of the first embodiment of the present disclosure constitutes an engine room (power station) 2, in which a power source of the vehicle 1 is provided. The vehicle 1 includes a radiator 10 provided inside the engine room 2, an engine (first power source) 20, a transmission 30, a motor (second power source) 40 and air-conditioning device 50, and a shutter grille device 60 provided in an opening part (air intake) 1a formed in a front end surface of the vehicle 1 to open and close the opening part 1a. Hence, the vehicle 1 is a hybrid car that has both the engine 20 and the motor 40 as a power source. When the shutter grille device 60 is open, the radiator 10, engine 20, transmission 30, motor 40 and air-conditioning device 50 provided inside the engine room 2, are cooled by outside air guided into the engine room 2 through the opening part 1a, during travel of the vehicle 1.

<Sensors>

Figure 2:
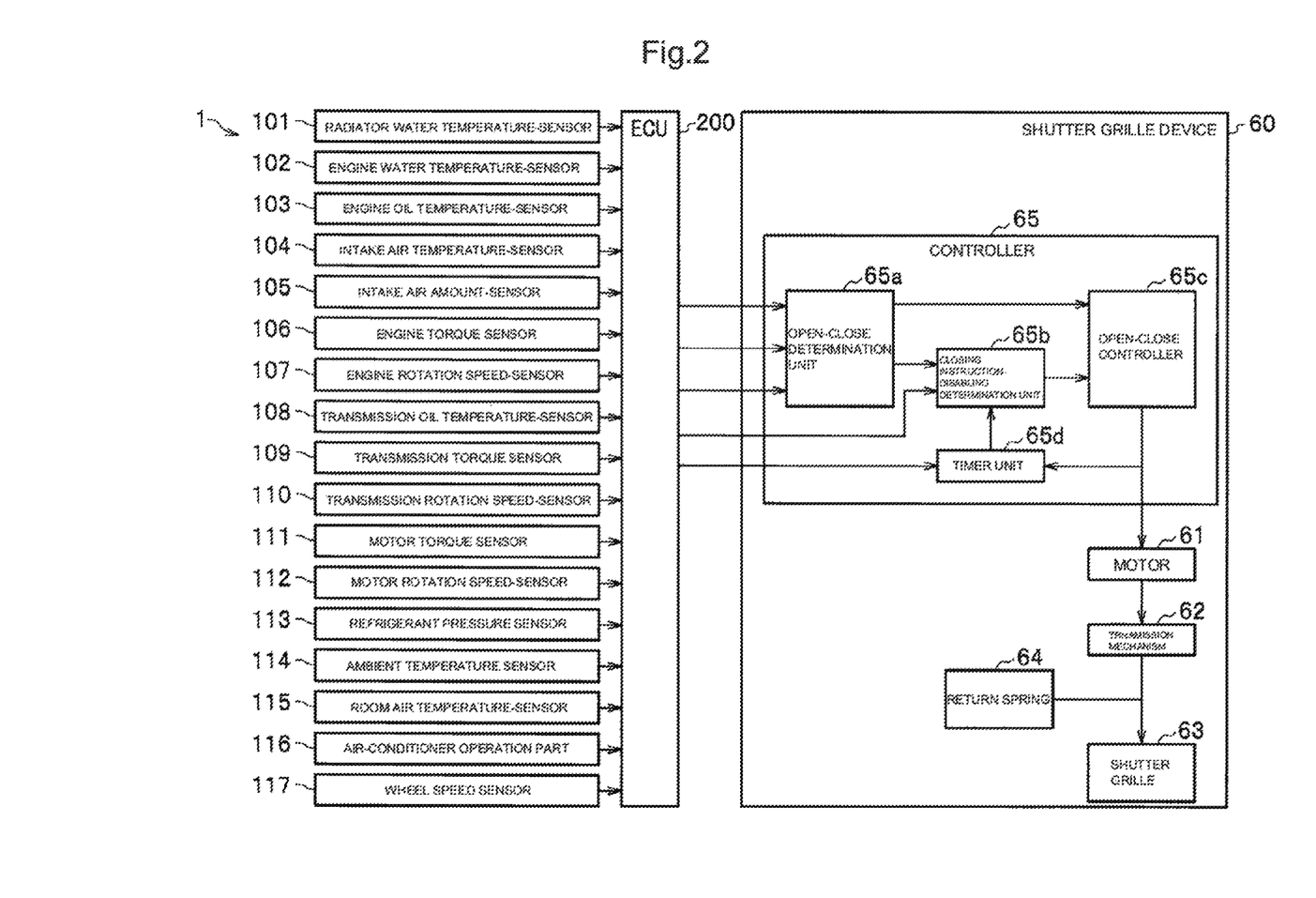
FIG. 2 is a diagram showing a system configuration of the vehicle to which the shutter grille device of the embodiment of the present disclosure is applied.

As shown in FIG. 2, the vehicle 1 of the first embodiment of the present disclosure includes a radiator water temperature-sensor 101, an engine water temperature-sensor 102, an engine oil temperature-sensor 103, an intake air temperature-sensor 104, an intake air amount-sensor 105, an engine torque sensor 106, an engine rotation speed-sensor 107, a transmission oil temperature-sensor 108, a transmission torque sensor 109, a transmission rotation speed-sensor 110, a motor torque sensor 111, a motor rotation speed-sensor 112, a refrigerant pressure sensor 113, an ambient temperature sensor 114, a room air temperature-sensor 115, an air-conditioner operation part 116, and wheel speed sensors 117 provided for each wheel.

The radiator water temperature-sensor 101 is a sensor that detects the temperature of cooling water that has passed through the radiator 10 and has exchanged heat (i.e., radiator water temperature), and outputs the detected radiator water temperature to a later-mentioned ECU 200.

The engine water temperature-sensor 102 is a sensor that detects the temperature of cooling water of the engine 20 (i.e., engine water temperature), and outputs the detected engine water temperature to the ECU 200.

The engine oil temperature-sensor 103 is a sensor that detects the temperature of lubricating oil of the engine 20 (i.e., engine oil temperature), and outputs the detected engine oil temperature to the ECU 200.

The intake air temperature-sensor 104 is a sensor that detects the temperature of intake air of the engine 20 (i.e., intake air temperature), and outputs the detected intake air temperature to the ECU 200.

The intake air amount-sensor 105 is a sensor that detects the intake amount of air sucked into the engine 20, and outputs the detected intake air amount to the ECU 200.

The engine torque sensor 106 is a sensor that detects the torque of an output shaft of the engine 20 (i.e., engine torque), and outputs the detected engine torque to the ECU 200.

The engine rotation speed-sensor 107 is a sensor that detects the rotation speed of the output shaft of the engine 20 (i.e., engine rotation speed), and outputs the detected engine rotation speed to the ECU 200.

The transmission oil temperature-sensor 108 is a sensor that detects the temperature of lubricating oil of the transmission 30 (i.e., transmission oil temperature), and outputs the detected transmission oil temperature to the ECU 200.

The transmission torque sensor 109 is a sensor that detects the torque of the transmission 30 (i.e., transmission torque), and outputs the detected transmission torque to the ECU 200.

The transmission rotation speed-sensor 110 is a sensor that detects the rotation speed of the transmission 30 (i.e., transmission rotation speed), and outputs the detected transmission rotation speed to the ECU 200.

The motor torque sensor 111 is a sensor that detects the torque of the motor 40 (i.e., motor torque), and outputs the detected motor torque to the ECU 200.

The motor rotation speed-sensor 112 is a sensor that detects the rotation speed of the motor 40 (i.e., motor rotation speed), and outputs the detected motor rotation speed to the ECU 200.

The refrigerant pressure sensor 113 is a sensor that detects a pressure of the air-conditioning device 50 after passing through the compressor (i.e., refrigerant pressure), and outputs the detected refrigerant pressure to the ECU 200.

The ambient temperature sensor 114 is a sensor that detects the temperature of outside air (i.e., ambient temperature), and outputs the detected ambient temperature to the ECU 200.

The room air temperature-sensor 115 is a sensor that detects the temperature inside the vehicle 1 (i.e., room air temperature), and outputs the detected room air temperature to the ECU 200.

The air-conditioner operation part 116 is buttons, for example, that are provided inside the vehicle 1 to set operational conditions of the air-conditioning device 50, and outputs operation results to the ECU 200.

The wheel speed sensor 117 is a sensor that detects the rotation speed of a wheel (i.e., wheel speed) of the vehicle 1, and outputs the detected wheel speed to the ECU 200.

<ECU>

In addition, the vehicle 1 includes the ECU (Electrical Control Unit) 200. The ECU 200 is configured of a CPU (Central Processing Unit), a ROM (Read-Only Memory), a RAM (Random Access Memory), an input/output circuit, and other components, and is a controller that controls devices of the vehicle 1 on the basis of detection results of various sensors, for example. In the embodiment, the ECU 200 outputs an opening request and closing request of a shutter grille 63 to a controller 65 of the shutter grille device 60, on the basis of viewpoints including fuel efficiency, marketability, and functional guarantee.

<Opening and Closing Requests for Fuel Efficiency>
<<Function: Improvement of Aerodynamic Performance>>
Output a closing request except for when issuing an opening request due to constraints.
<<Function: Improvement of Warm-Up Performance (Suppression of Heat Radiation)>>
Output a closing request when the transmission oil temperature is lower than a closing threshold.
Output a closing request when the engine water temperature is lower than a closing threshold.
<<Function: Avoidance of High Engine Water Temperature>>
Output an opening request when the engine water temperature is not lower than an opening threshold.
Output an opening request immediately before actuation of a fan of the radiator 10 based on the radiator water temperature and the engine water temperature.
<<Function: Avoidance of High Transmission Oil Temperature>>
Output an opening request when the transmission oil temperature is not lower than an opening threshold (temperature at which efficiency of transmission 30 deteriorates).
<<Function: Avoidance of High Engine Intake Air Temperature>>
Output an opening request when the intake air temperature of the engine 20 is not lower than an opening threshold.
<<Function: Avoidance of Interference with Fuel Efficiency Device>>
Output an opening request in a VTC (Valve Timing Control) prohibition region.
Output an opening request in an idle speed-increase region.
Output an opening request in a VTEC (Variable valve Timing and lift Electronic Control system) prohibition region, when the engine water temperature is high.

<Opening and Closing Requests for Marketability>
<<Function: Assurance of Air-Conditioning Device Marketability>>
Output an opening request upon receipt of a Hi request of the fan of the radiator 10, which is issued when pressure of the refrigerant of the air-conditioning device 50 is high.
<<Function: Avoidance of Deterioration in Torque Estimation Accuracy of Compressor of Air-Conditioning Device 50>>
Output an opening request upon receipt of a Lo request of the fan of the radiator 10, which is issued when the pressure of the refrigerant of the air-conditioning device 50 is high, and the speed is low.
<<Function: Coking Prevention>>
If the vehicle 1 is a vehicle equipped with a turbo charger, output an opening request when the temperature (intake air temperature) of air compressed by a compressor (not shown) of the turbo charger is not lower than a coking occurrence temperature.

<Opening and Closing Requests for Functional Guarantee>
<<Function: Avoidance of High Engine Oil Temperature>>
Output an opening request if the engine oil temperature is not lower than an opening threshold, upon receipt of a Hi request of the fan of the radiator 10.
<<Function: Avoidance of High Engine Water Temperature>>
Output an opening request when the engine water temperature is not lower than a heat resistant temperature of parts inside the engine room 2.
<<Function: Avoidance of High Transmission Oil Temperature>>
Output an opening request when the transmission oil temperature is not lower than an opening threshold.

That is, depending on the current temperature of the devices inside the engine room 2 (radiator water temperature, engine water temperature, engine oil temperature, transmission oil temperature and the like), the ECU 200 outputs an opening request when the temperature is not lower than an opening threshold, and outputs a closing request when the temperature is lower than a closing threshold.

Also, the ECU 200 outputs the opening request and closing request on the basis of parameters related to a possible rise in the temperature inside the engine room 2, such as refrigerant pressure and ambient temperature.

The ECU 200 also outputs the opening request and closing request on the basis of controlled states of the engine 20.

The ECU 200 periodically determines whether or not to output the opening request and closing request regarding the parameters, and outputs the opening request or closing request depending on the determination result. Note that although the ECU 200 is described as a single controller in the embodiment, the ECU may be configured of multiple separate controllers such as an engine ECU.

<Shutter Grille Device>

The shutter grille device 60 is a device that is provided in the opening part 1a for guiding air into the engine room 2, to open and close the opening part 1a. The shutter grille device 60 includes a motor 61 provided in the air intake, a transmission mechanism 62, the shutter grille 63, a return spring 64, and the controller 65.

In the embodiment, the motor 61, the transmission mechanism 62, the return spring 64, and the controller 65 are formed into a unit. To be specific, the motor 61, the transmission mechanism 62, and the controller 65 are accommodated in an unillustrated housing, and the return spring 64 is attached to an output shaft of the transmission mechanism 62 protruding from the housing.

<<Motor>>

The motor 61 is a power source that generates drive power (rotary force) for opening and closing the shutter grille 63.

<<Transmission Mechanism>>

The transmission mechanism 62 is configured of components such as multiple gears, and transmits the rotary force generated by the motor 61 to the shutter grille 63.

<<Shutter Grille>>

The shutter grille 63 is provided in the opening part 1a formed in the front surface of the vehicle 1, and is a shutter main body that opens and closes the opening part 1a. The shutter grille 63 includes multiple vertically arranged vanes, and can create two states which are: a closed state in which the multiple vanes are directed substantially vertically to close the opening part 1a; and an open state in which the multiple vanes are directed substantially horizontally to open the opening part 1a.

<<Return Spring>>

The return spring 64 is biasing means that acts to bias the shutter grille 63 in the opening direction. In the embodiment, the return spring 64 is a power spring attached to the output shaft of the transmission mechanism 62.

In the embodiment, the shutter grille device 60 is a normally open shutter. In other words, when the motor 61 is not operating, the shutter grille 63 is opened by the biasing force of the return spring 64. Meanwhile, when the motor 61 is operating, the shutter grille 63 is closed by the rotary force of the motor 61 acting against the biasing force of the return spring 64. Hence, the shutter grille device 60 requires electric power when closing and maintaining the closed state of the shutter grille 63, but does not require electric power when opening and maintaining the opened state of the shutter grille 63.

When the vehicle 1 runs with the shutter grille 63 closed, outside air hits the closed shutter grille 63, and is not guided into the engine room 2. This improves aerodynamic performance of the vehicle 1, and improves performance of warming up the interior of the engine room 2.

When the vehicle 1 runs with the shutter grille 63 open, outside air is guided into the engine room 2 through the open shutter grille 63. This improves performance of cooling the interior of the engine room 2.

<<Controller>>

The controller 65 acquires an opening request and closing request output by the ECU 200, controls the motor 61 on the basis of the acquired opening request and closing request, and opens and closes the shutter grille 63. Additionally, the controller 65 disables closing of the shutter grille 63 during a first interval after opening of the shutter grille 63, and disables opening of the shutter grille 63 during a second interval after closing of the shutter grille 63. In other words, the controller 65 enables closing of the shutter grille 63 after the elapse of the first interval after opening, and enables opening of the shutter grille 63 after the elapse of the second interval after closing. Here, the first interval is set longer than the second interval.

Hereinbelow, a case where the second interval is substantially zero will be described as an example. In the embodiment, the controller 65 is configured of a CPU, a ROM, a RAM, an input/output circuit, and other components, and includes or may embody, as function units, an open-close determination unit 65a, a closing instruction-disabling determination unit 65b, an open-close controller 65c, and a timer unit 65d.

<<Open-Close Determination Unit>>

The open-close determination unit 65a acquires an opening request and closing request output by the ECU 200, and determines whether to open or close the shutter grille 63 on the basis of the acquired opening request and closing request. If requests acquired within a predetermined time include an opening request, the open-close determination unit 65a determines to open the shutter grille 63, and outputs an opening instruction to the open-close controller 65c. If requests acquired within the predetermined time do not include an opening request, but only include closing requests, the open-close determination unit 65a determines to close the shutter grille 63, and outputs a closing instruction to the closing instruction-disabling determination unit 65b. Here, the predetermined time is set sufficiently shorter than the later-mentioned first interval.

Also, when outputting opening instructions, the open-close determination unit 65a continues to output opening instructions until the next determination of closing the shutter grille 63, and when outputting closing instructions, the open-close determination unit continues to output closing instructions until the next determination of opening the shutter grille 63.

<<Closing Instruction-Disabling Unit>>

The closing instruction-disabling determination unit 65b is a function unit that determines whether to enable or disable a shutter grille closing instruction, and disables closing of the shutter grille 63 during the first interval after opening of the shutter grille 63. In the embodiment, upon acquisition of a closing instruction-disabling signal output from the timer unit 65d, the closing instruction-disabling determination unit 65b disables closing of the shutter grille 63 until the next acquisition of a closing instruction-enabling signal. Also, upon acquisition of a closing instruction-enabling signal output from the timer unit 65d, the closing instruction-disabling determination unit 65b enables closing of the shutter grille 63 until the next acquisition of a closing instruction-disabling signal. That is, upon acquisition of a closing instruction within the first interval timed by the later-mentioned timer unit 65d, the closing instruction-disabling determination unit 65b disables the closing instruction and does not output the closing instruction to the open-close controller 65c. Meanwhile, upon acquisition of a closing instruction at a time other than the first interval, the closing instruction-disabling determination unit 65b outputs the closing instruction to the open-close controller 65c.

Note that if it is assumed that opening of the shutter grille 63 will be required soon after closing of the shutter grille 63 after the elapse of the first interval, the closing instruction-disabling determination unit 65b can extend the disabling of closing of the shutter grille 63. This control method will be described in a later-mentioned second operation example.

<<Open-Close Controller>>

The open-close controller 65c acquires an instruction output from the open-close determination unit 65a, and controls the motor 61 on the basis of the acquired instruction.

Upon acquisition of an opening instruction output from the open-close determination unit 65a, the open-close controller 65c outputs the opening instruction to the motor 61. The motor 61 acquires the opening instruction, and rotates according to the acquired opening instruction. This rotation opens the shutter grille 63. The open state is maintained until the motor 61 next acquires a closing instruction. The open state is maintained by the motor 61 or the return spring 64.

Upon acquisition of a closing instruction output from the open-close determination unit 65a, the open-close controller 65c outputs the closing instruction to the motor 61. The motor 61 acquires the closing instruction, and suspends its action according to the acquired closing instruction. The closed state is maintained until the motor 61 next acquires an opening instruction.

Also, the open-close controller 65c sets and stores a flag indicating open and closed states of the shutter grille 63. Flag "0" indicates a closed state, and flag "1" indicates an open state.

Upon acquisition of an opening instruction in a suspended state (flag "0"), the motor 61 sets the flag to "1," and outputs a notification signal (timer start signal) to the timer unit 65d.

Also, upon acquisition of a closing instruction in an operating state (flag "1"), the motor 61 sets the flag to "0."

<<Timer Unit>>

Upon acquisition of a timer start signal, the timer unit 65d times the first interval with an unillustrated timer, and outputs a closing instruction-disabling signal to the closing instruction-disabling determination unit 65b. Additionally, upon completion of timing of the first interval, the timer unit 65d outputs a closing instruction-enabling signal to the closing instruction-disabling determination unit 65b.

<Method of Setting First Interval>

Hereinafter, examples of the method of setting the first interval will be described.

1. Predetermined Value

Assuming that the vehicle 1 travels a predetermined distance in a predetermined number of years, a relation between a lifetime average speed of the vehicle 1, and an opening and closing interval that can keep the number of opening and closing operations of the shutter grille 63 within a predetermined number of times is obtained in advance, by simulation and experiments, for example. According to the obtained relation, an opening and closing interval corresponding to a lower limit value of a market average speed of when the vehicle 1 actually appears on the market, is preset in the timer unit 65d as the first interval (e.g., 90 seconds).

2. Setting of First Interval Based on Speed

As in the case of "1. Predetermined value," assuming that the vehicle 1 travels a predetermined distance in a predetermined number of years, a relation between a lifetime average speed of the vehicle 1, and an opening and closing interval that can keep the number of opening and closing operations of the shutter grille 63 within a predetermined number of times is obtained in advance, by simulation and experiments, for example. The relation (see FIG. 3) between speed and the opening and closing interval (first interval) thus obtained is previously stored in the timer unit 65d.

Figure 3:
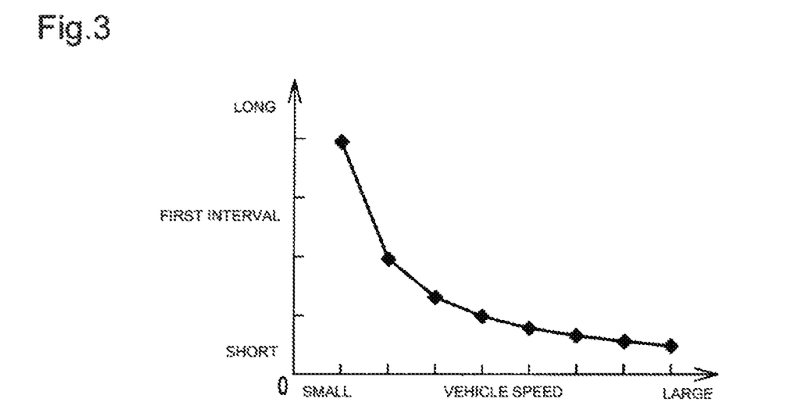
FIG. 3 is a graph showing an example of a relation between speed and a first interval.

The timer unit 65d acquires speed (calculated on the basis of detection result of wheel speed sensor 117) output from the ECU 200, refers to the relation shown in FIG. 3 on the basis of the acquired speed to read out the appropriate first interval, and uses the read out first interval.

As shown in FIG. 3, the first interval is set such that the lower the speed, the longer the first interval. This measure is taken because at low speed, the devices inside the engine room 2 are less likely to be cooled even if the shutter grille 63 is open.

3. Setting of First Interval Based on Cumulative Total of Number of Operations of Shutter Grille 63

A relation (see FIG. 4) between a lifetime mileage of the vehicle 1 and a lifetime number of operations of the shutter grille 63 is previously stored in the timer unit 65d. Also, a relation (see FIG. 5) between an operation frequency coefficient in FIG. 4 and the first interval is previously stored in the timer unit 65d.

Figure 4:
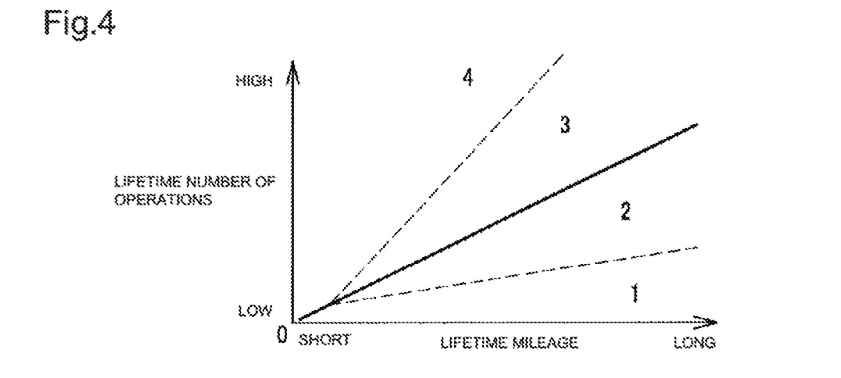
FIG. 4 is a graph showing an example of a relation among a lifetime mileage of a vehicle, a lifetime number of operations of a shutter grille, and an operation frequency coefficient.

The timer unit 65d refers to the relation shown in FIG. 4, on the basis of a lifetime mileage output from the ECU 200, and a lifetime number of operations output from the open-close controller 65c or counted by the timer unit 65d, and thereby reads out the appropriate operation frequency coefficient.

Figure 5:
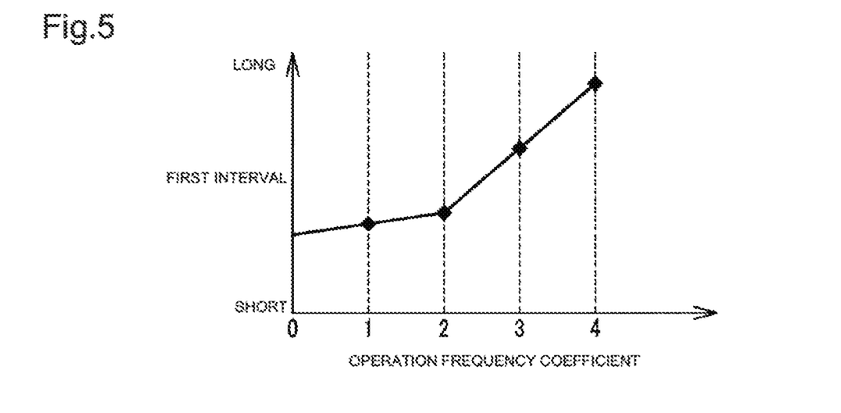
FIG. 5 is a graph showing an example of a relation between the operation frequency coefficient and a first interval.

Then, the timer unit 65d refers to the relation shown in FIG. 5 on the basis of the read out operation frequency coefficient to read out the appropriate first interval, and uses the read out first interval.

As shown in FIGS. 4 and 5, the first interval is set such that: if the lifetime mileage is constant, the larger the lifetime number of operations, the longer the first interval; and if the lifetime number of operations is constant, the shorter the lifetime mileage, the longer the first interval. Note that in FIG. 4, a line between operation frequency coefficients "2" and "3" indicates the upper limit target of the number of operations to the lifetime mileage. Hence, in FIG. 5, a line indicating the first interval to the operation frequency coefficient is tilted steeper in areas of operation frequency coefficients "3" "4," than in areas of operation frequency coefficients "1" "2."

According to this setting, if the operation frequency of the shutter grille 63 is high, the first interval can be set longer to reduce the number of operations, and ensure longer product life of the shutter grille device 60.

OPERATION EXAMPLES

Next, operation examples of the shutter grille device 60 of the first embodiment of the present disclosure will be described. In the following first and second operation examples, for the sake of simplicity, an exemplary case will be described in which the first interval is a predetermined value, and only opening requests and closing requests based on a radiator water temperature detected by the radiator water temperature-sensor 101 are output from the ECU 200. Note that open and closed states of the shutter grille 63 coincide not with output of opening and closing instructions of the open-close determination unit 65a, but with output of opening and closing instructions of the open-close controller 65c.

First Operation Example

Figure 6:
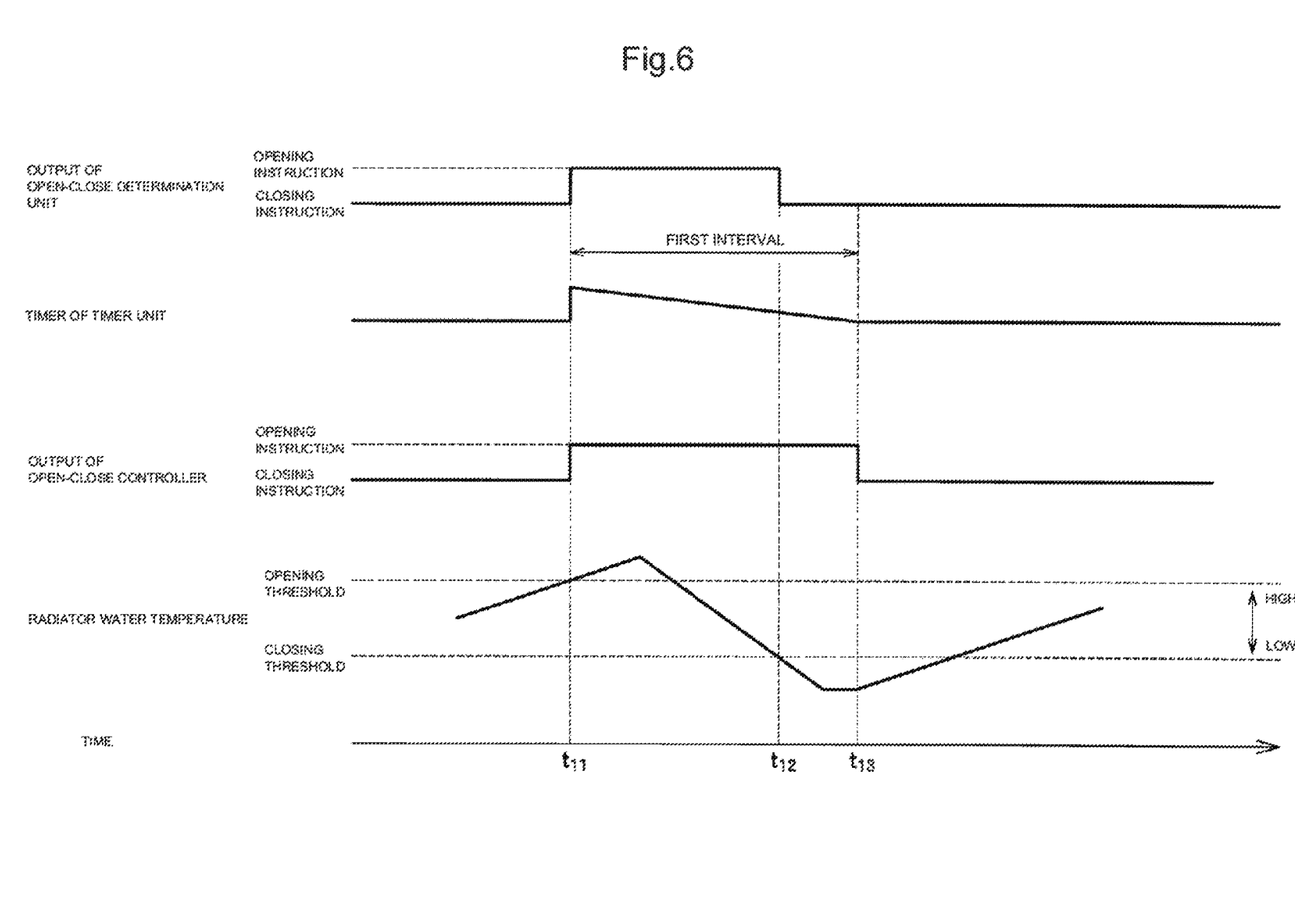
FIG. 6 is a timing chart for describing a first operation example of the shutter grille device of a first embodiment of the present disclosure.

The first operation example is an operation example of a case where the devices inside the engine room 2 are relatively light loaded. As shown in FIG. 6, when the vehicle 1 with the shutter grille 63 closed runs before time $t_{11}$, the radiator water temperature rises.

At time $t_{11}$, when the radiator water temperature becomes equal to or higher than an opening threshold, the ECU 200 outputs an opening request to the open-close determination unit 65a. The open-close determination unit 65a acquires the opening request, and outputs an opening instruction to the open-close controller 65c on the basis of the acquired opening request. The open-close controller 65c acquires the opening instruction, and outputs the acquired opening instruction to the motor 61 to open the shutter grille 63, and also outputs a timer start signal to the timer unit 65d to make the timer unit 65d time the first interval.

When the vehicle 1 with the shutter grille 63 open runs, the radiator water temperature drops.

At time $t_{12}$ before the elapse of the first interval, when the radiator water temperature drops below a closing threshold, the ECU 200 outputs a closing request to the open-close determination unit 65a. The open-close determination unit 65a acquires the closing request, and outputs a closing instruction to the closing instruction-disabling determination unit 65b on the basis of the acquired closing request. The closing instruction-disabling determination unit 65b acquires the closing instruction, but since the first interval is being timed, does not output the closing instruction to the open-close controller 65c.

At time $t_{13}$ after the elapse of the first interval, the radiator water temperature is lower than the closing threshold, and therefore the ECU 200 continues to output a closing request to the open-close determination unit 65a. The open-close determination unit 65a acquires the closing request, and outputs a closing instruction to the closing instruction-disabling determination unit 65b on the basis of the acquired closing request. The closing instruction-disabling determination unit 65b acquires the closing instruction, and since the first interval has elapsed, determines to allow the closing instruction, and outputs the closing instruction to the open-close controller 65c. The open-close controller 65c acquires the closing instruction, and outputs the acquired closing instruction to the motor 61 to close the shutter grille 63.

According to this operation example, the timing of closing the shutter grille 63 can be delayed for a time $t_{13}$-$t_{12}$, and therefore the number of opening and closing operations of the shutter grille 63 can be reduced.

Note that even when the ECU 200 outputs the opening request and closing request based on each of the multiple parameters, the open-close determination unit 65a rarely outputs an opening instruction during time $t_{12}$ to $t_{13}$. Hence, the closing instruction-disabling determination unit 65b can also be regarded as a closing instruction holding unit that holds the closing instruction output from the open-close determination unit 65a during the first interval, before transferring it to the open-close controller 65c.

Second Operation Example

Figure 7:
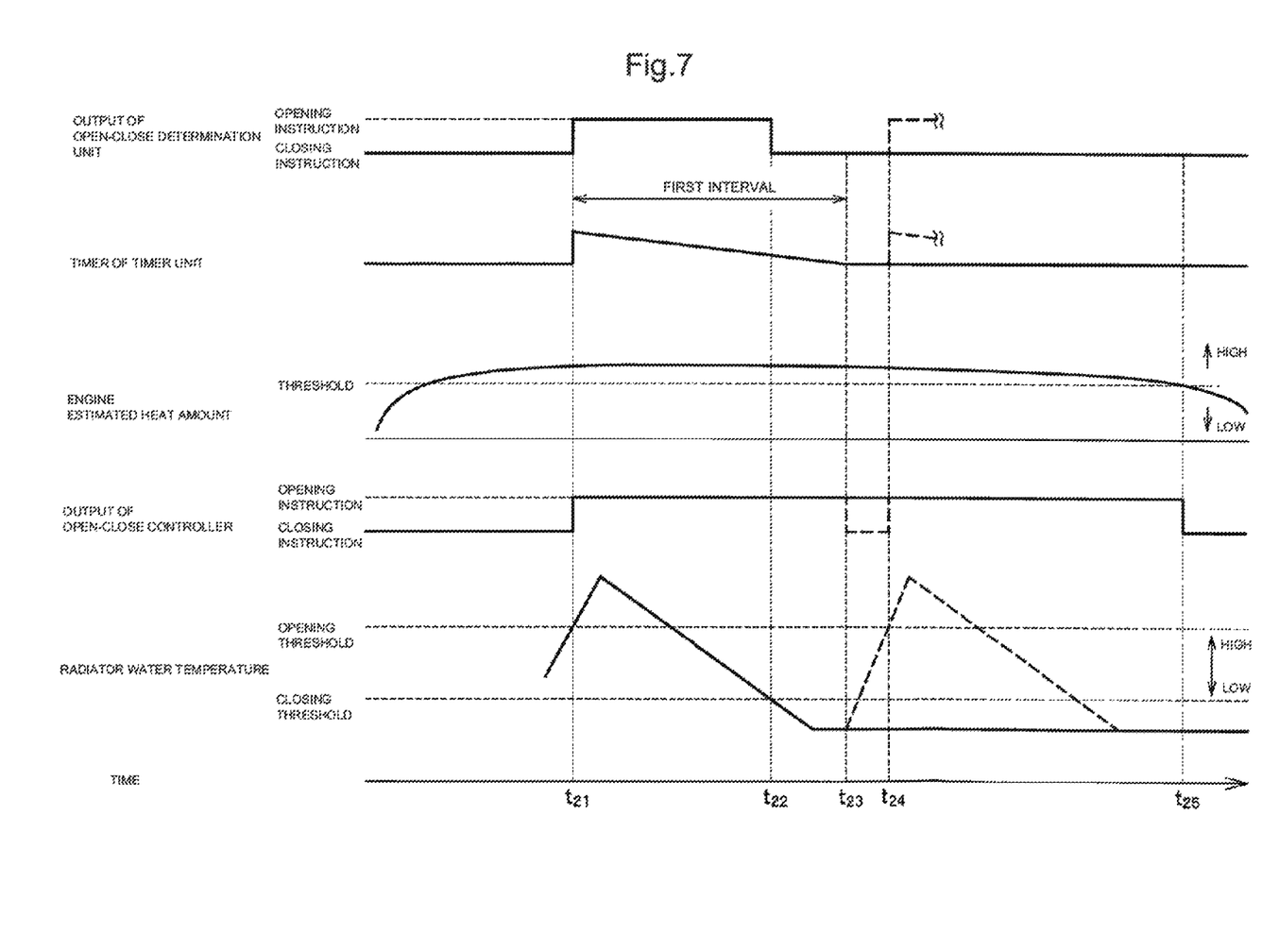
FIG. 7 is a timing chart for describing a second operation example of the shutter grille device of the first embodiment of the present disclosure.

The second operation example is an operation example of a case where the devices inside the engine room 2 are relatively heavy loaded. As shown in FIG. 7, when the vehicle 1 with the shutter grille 63 closed runs before $t_{21}$, the radiator water temperature rises.

At time $t_{21}$, when the radiator water temperature becomes equal to or higher than an opening threshold, the ECU 200 outputs an opening request to the open-close determination unit 65a. The open-close determination unit 65a acquires the opening request, and outputs an opening instruction to the open-close controller 65c, on the basis of the acquired opening request. The open-close controller 65c acquires the opening instruction, and outputs the acquired opening instruction to the motor 61 to open the shutter grille 63, and also outputs a timer start signal to the timer unit 65d to make the timer unit 65d time the first interval.

When the vehicle 1 with the shutter grille 63 open runs, the radiator water temperature drops.

At time $t_{22}$ before the elapse of the first interval, when the radiator water temperature drops below a closing threshold, the ECU 200 outputs a closing request to the open-close determination unit 65a. The open-close determination unit 65a acquires the closing request, and outputs a closing instruction to the closing instruction-disabling determination unit 65b on the basis of the acquired closing request. The closing instruction-disabling determination unit 65b acquires the closing instruction, but since the first interval is being timed, does not output the closing instruction to the open-close controller 65c.

At time $t_{23}$ after the elapse of the first interval, the radiator water temperature is lower than the closing threshold, and therefore the ECU 200 continues to output a closing request to the open-close determination unit 65a. The open-close determination unit 65a acquires the closing request, and outputs a closing instruction to the closing instruction-disabling determination unit 65b on the basis of the acquired closing request. Meanwhile, the ECU 200 calculates an estimated engine heat amount, and outputs the calculated estimated engine heat amount to the closing instruction-disabling determination unit 65b. The closing instruction-disabling determination unit 65b acquires the closing instruction and the estimated engine heat amount, and since the first interval has elapsed, determines whether or not the estimated engine heat amount is not lower than a preset threshold. Since the estimated engine heat amount at this timing is not lower than the threshold, the closing instruction-disabling determination unit extends the disabling of closing of the shutter grille 63, and does not output the closing instruction to the open-close controller 65c.

Then, at time $t_{25}$, when the estimated engine heat amount drops below the threshold, the closing instruction-disabling determination unit 65b cancels the disabling of closing of the shutter grille 63. That is, the disabling of closing is extended until the estimated engine heat amount drops below the threshold. At time $t_{25}$, the radiator water temperature is lower than the closing threshold, and therefore the ECU 200 continues to output a closing request to the open-close determination unit 65a. The open-close determination unit 65a acquires the closing request, and outputs a closing instruction to the closing instruction-disabling determination unit 65b on the basis of the acquired closing request. The closing instruction-disabling determination unit 65b acquires the closing instruction, and since the first interval has elapsed and the estimated engine heat amount is lower than the threshold, determines to allow the closing instruction, and outputs the closing instruction to the open-close controller 65c. The open-close controller 65c acquires the closing instruction, and outputs the acquired closing instruction to the motor 61 to close the shutter grille 63.

In the second operation example, assume a case where the closing instruction-disabling determination unit 65b allows the closing instruction after the elapse of the first interval, without considering the estimated engine heat amount. Here, even if the shutter grille 63 is closed at time $t_{23}$ as indicated by dotted lines in FIG. 7 in the graphs of the output of the open-close determination unit, timer of the timer unit, output of the open-close controller, and radiator water temperature, the radiator water temperature will become equal to or higher than the opening threshold due to heat of the engine 20 at time $t_{24}$ before time $t_{25}$, and will open the shutter grille 63. In this case, the opening and closing operations of the shutter grille 63 at times $t_{23}$, $t_{24}$ are wasted. Meanwhile, in the second operation example, the disabling of closing of the shutter grille 63 is extended on the basis of the estimated engine heat amount, so that such unnecessary opening and closing operations of the shutter grille 63 can be suppressed.

Thus, as parameters for extending the disabling of closing of the shutter grille 63, one or a combination of two or more of the following parameters may be used.

A load ratio or estimated heat amount of the engine 20 (or engine 20 and transmission 30)

A load ratio or estimated heat amount of the motor 40 (or load ratio or estimated heat amount of PCU (Power Control Unit) including motor 40)

A load ratio of the air-conditioning device 50

Ambient temperature (including temperature difference between ambient temperature and temperature of engine room 2 (e.g., temperature of devices inside engine room 2) or room air temperature)

For example, the estimated heat amount of the engine 20 can be calculated on the basis of an output of the engine 20, intake air amount, engine torque, and engine rotation speed.

Also, the estimated heat amount of the motor 40 can be calculated on the basis of a motor torque and motor rotation speed of the motor 40.

Also, the load ratio of the air-conditioning device 50 can be calculated on the basis of a refrigerant pressure of the air-conditioning device 50, ambient temperature, room air temperature, and settings of the air-conditioning device 50.

That is, after opening of the shutter grille 63 and the elapse of the first interval, the controller 65 extends the disabling of closing of the shutter grille 63 when a parameter related to ambient temperature, load of devices in the engine room 2, or the estimated heat amount of the devices in the engine room 2, is not lower than a threshold, and when the parameter drops below the threshold, cancels the disabling of closing of the shutter grille 63.

Also, the controller 65 may be configured to use multiple parameters among parameters related to ambient temperature, load of devices in the engine room 2, or the estimated heat amount of the devices in the engine room 2, extend the disabling of closing of the shutter grille 63 if one parameter is not lower than a threshold of the parameter, and cancel the disabling of closing of the shutter grille 63 when all parameters drop below the thresholds of the parameters.

Note that the load ratio or estimated heat amount of the devices may be calculated by the ECU 200 that has acquired detection results of the sensors, or may be calculated by the closing instruction-disabling determination unit 65*b* to which the detection results of the sensors are transferred from the ECU 200.

According to this operation example, the timing of closing the shutter grille 63 can be delayed not only for time $t_{23}$-$t_{22}$, but also for time $t_{25}$-$t_{23}$. Also, unnecessary closing of the shutter grille 63 immediately after opening the shutter grille 63 can be eliminated, and therefore the number of opening and closing operations of the shutter grille 63 can be reduced.

Since the first interval in which closing is disabled after opening is set longer than the second interval (substantially zero in the embodiment) in which opening is disabled after closing, in the shutter grille device 60 of the first embodiment of the present disclosure, the number of opening and closing operations can be reduced to extend product life.

Also, since the shutter grille device 60 is a mechanical normally open type using the return spring 64, electric power is required only when closing, and not when opening. Hence, energy saving and cost reduction can be achieved.

Also, when setting a longer first interval at lower speed, the shutter grille device 60 can favorably cool the devices inside the engine room 2 even during low-speed travel.

Also, when the first interval is preset on the basis of the target lifetime durable number of opening and closing operations and the predicted lifetime number of operations of the shutter grille 63, the shutter grille device 60 can reduce the number of opening and closing operations to extend product life, while favorably exerting effects of opening and closing the shutter grille 63.

Also, when the first interval is set on the basis of the lifetime mileage of the vehicle 1 and the lifetime number of operations of the shutter grille 63, the shutter grille device 60 can set a longer first interval when the lifetime number of operations of the shutter grille is large, for example, to reduce the number of opening and closing operations and extend product life.

Also, after the elapse of the first interval, the shutter grille device 60 continues to disable closing of the shutter grille 63 when a parameter related to ambient temperature, load of devices in the engine room 2, or the estimated heat amount of the devices in the engine room 2, is not lower than a threshold. Hence, the number of opening and closing operations can be more effectively reduced to extend product life.

Also, after the elapse of the first interval, the shutter grille device 60 continues to disable closing of the shutter grille 63 when it is assumed that opening will be required after closing. Hence, the number of opening and closing operations can be more effectively reduced to extend product life.

Second Embodiment

The shutter grille device of the second embodiment of the present disclosure will be described with focusing on the difference from the shutter grille device 60 of the first embodiment. As shown by FIG. 2, in the shutter grille device 60 of the second embodiment, the controller 65 enables closing of the shutter grille 63 at the time when the vehicle 1 has run a predetermined amount of distance after opening of the shutter grille 63. In other words, the controller 65 disables closing of the shutter grille 63 if the vehicle 1 has not run a predetermined amount of distance after opening of the shutter grille 63.

Figure 8:
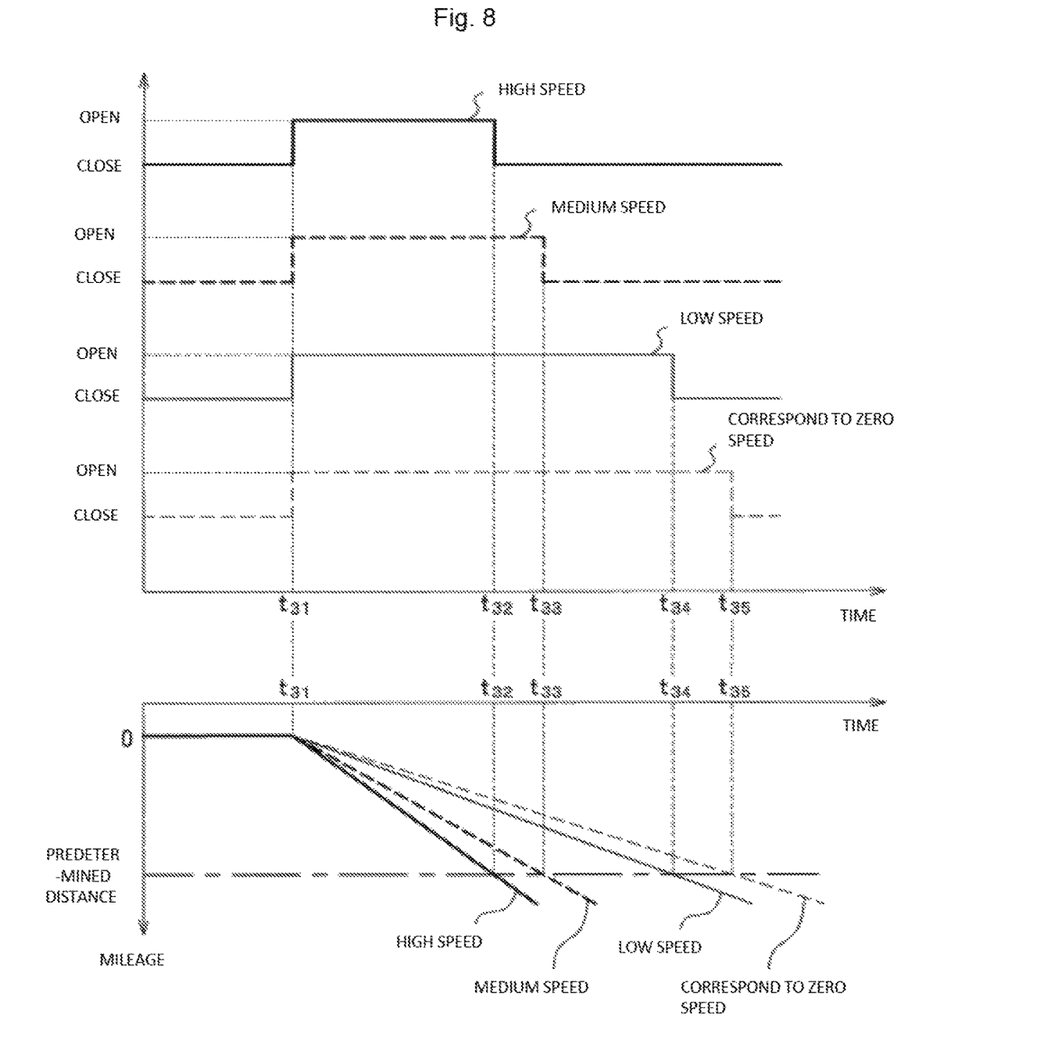
FIG. 8 is a timing chart for describing an operation example of the shutter grille device of a second embodiment of the present disclosure.

Here, as shown by FIG. 8, when the vehicle 1 travels with fast speed, the vehicle 1 will have run a predetermined amount of distance after opening of the shutter grille 63 with short period of time (from time $t_{31}$ to time $t_{32}$). When the vehicle 1 travels with medium speed, the vehicle 1 will have run the predetermined amount of distance after opening of the shutter grille 63 with medium period of time (from time $t_{31}$ to time $t_{33}$). When the vehicle 1 travels with slow speed, the vehicle 1 will have run the predetermined amount of distance after opening of the shutter grille 63 with long period of time (from time $t_{31}$ to time $t_{33}$).

The controller 65 enables closing of the shutter grille 63 at the time when the vehicle 1 has run a predetermined amount of distance after opening of the shutter grille 63. Thus, it is possible to obtain an operation similar to the first embodiment in which the first interval is set such that the lower the speed of the vehicle, the longer the first interval becomes.

In the present embodiment, ECU 200 calculates the vehicle speed by using detection result of the wheel speed sensor 117 and a pre-stored diameter of the wheel, and outputs the calculated vehicle speed to the closing instruction disabling determination unit 65*b*. The closing instruction disabling determination unit 65*b* acquires the vehicle speed output from the ECU 200, and calculates mileage of the vehicle 1 since the shutter grille 63 was controlled to open, by using the acquired vehicle speed.

The ECU 200 may be configured to calculate mileage of the vehicle 1 by using the calculated vehicle speed, and output the calculated mileage to the closing instruction disabling determination unit 65*b*. In this structure, the closing instruction disabling determination unit 65*b* acquires the mileage output from the ECU 200 and calculates the mileage of the vehicle 1 since the shutter grille 63 was controlled to open, by using the acquired mileage.

The controller 65 also enables closing of the shutter grille 63 at the time when an interval time has elapsed after opening of the shutter grille 63. Here, the interval time is the time period (from time $t_{31}$ to time $t_{35}$) set so as to enable the closing of the shutter grille 63 when the vehicle speed is almost zero. The interval time is set to be longer than the time period (from time $t_{31}$ to time $t_{33}$) set for the slow speed of the vehicle 1.

Operation Example

Next, an operation example of the shutter grille device 60 of the second embodiment will be described with reference to FIG. 9 (also FIG. 2 as needed).

Figure 9:
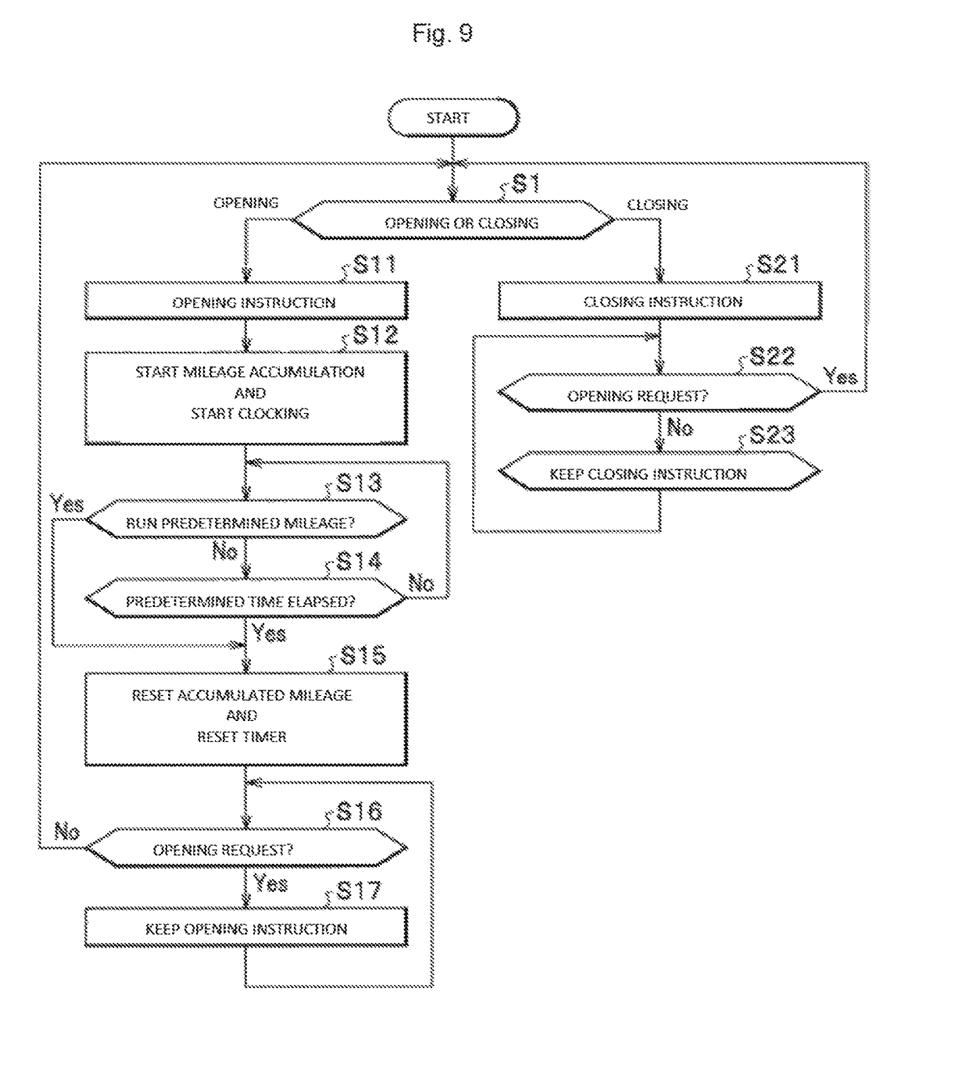
FIG. 9 is a flow chart for describing an operation example of the shutter grille device of the second embodiment of the present disclosure.

As shown by FIG. 9, the open-close determination unit 65a determines to open or close the shutter grille device 63 (step S1) using the opening request and the closing request output from the ECU 200. In this operation example, the open-close determination unit 65a determines to open when the unit 65a receives the opening request output from the ECU 200, and determines to close when the ECU 200 does not output the opening request (that is, when the unit 65a does not receive the opening request). If it is determined to open at the step S1, the open-close determination unit 65a outputs an opening instruction to the closing instruction-disabling determination unit 65b and the open-close controller 65c, and the open-close controller 65c outputs an opening instruction to the motor 61 (step S11: opening control of the shutter grille 63).

Next, the closing instruction-disabling determination unit 65b starts accumulating the mileage of the vehicle 1 after the opening of the shutter grille 63, and the timer unit 65d starts clocking after the opening of said shutter grille 63 (step S12). Here, the closing instruction-disabling determination unit 65b continues accumulating the mileage until the accumulated mileage of the vehicle 1 reaches a predetermined amount of distance, and the timer unit 65d continues clocking until the clocked time reaches the interval time ("No" at step S13 and "No" at step S14). That is, the open-close controller 65c cannot enable the closing of the shutter grille 63 while the accumulation of the mileage or the clocking is being continued.

If the accumulated mileage of the vehicle 1 reaches the predetermined amount of distance ("Yes' at step S13), or the clocked time reaches the interval time ("Yes" at step S14), the closing instruction-disabling determination unit 65b terminates the accumulation of the mileage of the vehicle 1 and resets the mileage, and timer unit 65d terminates the clocking and resets the clocked time (timer) (step S15). By resetting the mileage and the clocked time, the open-close controller 65c can enable the closing of the shutter grille 63.

Next, after the step 15, if the open-close determination unit 65a receives the opening request ("Yes" at step S16), the open-close controller 65c continues to output the opening instruction to the motor 61 (step S17). On the other hand, if the open-close determination unit 65a does not receive the opening request ("no" at step S16) after the step S15, the open-close determination unit 65a returns to step S1 and determines to open or close. This time, it is determined to close.

When it is determined to close at step S1, the open-close determination unit 65a outputs the closing instruction to the open-close controller 65c, the open-close controller 65c outputs the closing instruction to the motor 61 (step S21: closing of the shutter grille 63). Next, after the step S21, if the open-close determination unit 65a does not receive the opening request ("No" at step S22), the open-close controller 65c continues to output the closing instruction to the motor 61 (step S23). On the other hand, if the open-close determination unit 65a receives the opening request ("Yes" at step S22) after the step S21, the open-close determination unit 65a returns to step S1 and determines to open or close. This time, it is determined to open.

The shutter grille device 60 of the second embodiment enables closing of the shutter grille 63 at the time when the vehicle 1 has run a predetermined amount of distance after opening of the shutter grille 63. Thus, it is possible to obtain an operation similar to the first embodiment in which the first interval is set such that the lower the speed of the vehicle, the longer the first interval becomes.

The shutter grille device 60 determines, based on the mileage of the vehicle 1, the timing when the closing of the shutter grille 63 is enabled. Thus, compared with the first embodiment in which the time period of the first interval is adjusted according to change of the vehicle speed of the vehicle 1, it is possible to determine the timing when the closing of the shutter grille 63 is enabled by means of simpler scheme.

The shutter grille device 60 further enables closing of the shutter grille 63 at the time when an interval time has elapsed after opening of the shutter grille 63. Thus, it is possible to adequately enable closing of the shutter grille 63 even with extremely low vehicle speed or zero vehicle speed.

Although the embodiment of the present invention has been described, the invention is not limited to the above embodiment, and appropriate changes can be made without departing from the gist of the invention.

For example, the controller 65 may be configured not only to disable closing of the shutter grille 63 during the first interval after opening of the shutter grille 63, but also to disable opening of the shutter grille 63 during the second interval after closing of the shutter grille 63. In this case, opening of the shutter grille 63 can be disabled by providing an opening instruction-disabling determination unit similar to the closing instruction-disabling determination unit 65b between the open-close determination unit 65a and the open-close controller 65c, and providing a timer unit similar to the timer unit 65d, for the opening instruction-disabling determination unit.

As for the method of setting the second interval, settings can be made according to speed and the like as in the case of the first interval, as long as the second interval is shorter than the first interval.

Also, the opening and closing of the shutter grille device 60 is not limited to the aforementioned two states including the open state (fully open) and the closed state (fully closed), and the opening and closing may be gradual or non-gradual.

Also, the shutter grille device 60 is not limited to the mechanical normally open type using the return spring 64. For example, the shutter grille device 60 may omit the return spring 64, and may be a device that controls opening and closing of the shutter with a servomotor, for example, instead of a normally open shutter. In the second embodiment, the method for calculating the mileage of the vehicle 1 is not limited to the example described above. Although a specific form of embodiment has been described above and illustrated in the accompanying drawings in order to be more clearly understood, the above description is made by way of example and not as limiting the scope of the invention defined by the accompanying claims. The scope of the invention is to be determined by the accompanying claims.

Various modifications apparent to one of ordinary skill in the art could be made without departing from the scope of the invention. The accompanying claims cover such modifications.

We claim:

1. A shutter grille device comprising:
   a shutter grille provided in an air intake guiding air into a motor room in which a power source of a vehicle is provided; and
   a controller that controls opening and closing of said shutter grille, wherein:
   said controller disables closing of said shutter grille during a first interval after opening of said shutter grille, and has a second interval before enabling opening of said shutter grille after closing of said shutter grille; and
   said first interval is set longer than said second interval.

2. The shutter grille device according to claim 1, wherein said controller sets said first interval such that the lower a speed of the vehicle, the longer said first interval becomes.

3. The shutter grille device according to claim 1, wherein said first interval is preset using a target lifetime-durable-number-of-opening-and-closing operations, and a predicted lifetime number of operations of said shutter grille.

4. The shutter grille device according to claim 1, wherein said controller sets said first interval using a lifetime mileage of said vehicle, and a lifetime number of operations of said shutter grille.

5. The shutter grille device according to claim 1, wherein after the elapse of said first interval after opening of said shutter grille, said controller
   extends the disabling of closing of said shutter grille, when a parameter related to at least one of ambient temperature, load of a device in said motor room, and an estimated heat amount of the device in said motor room, is not lower than a threshold, and
   when said parameter drops below said threshold, cancels the disabling of closing of said shutter grille.

6. The shutter grille device according to claim 1, wherein after the elapse of said first interval after opening of said shutter grille, said controller extends the disabling of closing of said shutter grille when it is assumed that opening of said shutter grille will be required after closing of said shutter grille.

7. The shutter grille device according to claim 6, wherein after the elapse of said first interval after opening of said shutter grille, said controller extends the disabling of closing of said shutter grille when it is assumed that opening of said shutter grille will be required after closing of said shutter grille using a parameter related to at least one of ambient temperature, load of a device in said motor room, and an estimated heat amount of the device in said motor room.

8. The shutter grille device according to claim 1, wherein the shutter grille is opened when a shutter opening condition is satisfied, and the shutter grille is closed when a shutter closing condition is satisfied, and
   wherein the controller disables closing of said shutter grille during the first interval even if the shutter closing condition is satisfied.

9. A shutter grille device comprising:
   a shutter grille provided in an air intake guiding air into a motor room in which a power source of a vehicle is provided; and
   a controller that controls opening and closing of said shutter grille, wherein:
   said controller enables closing of said shutter grille at the time when the vehicle has run a predetermined amount of distance after opening of said shutter grille.

10. The shutter grille device according to claim 9, wherein the controller enables closing of said shutter grille at the time when an interval time has elapsed after opening of said shutter grille.

11. The shutter grille device according to claim 9, wherein the shutter grille is opened when a shutter opening condition is satisfied, and the shutter grille is closed when a shutter closing condition is satisfied, and
   wherein the controller does not enables closing of said shutter grille until the vehicle has run the predetermined amount of distance after opening of said shutter grille.

* * * * *